(12) United States Patent
Nishikawa et al.

(10) Patent No.: US 10,899,362 B2
(45) Date of Patent: Jan. 26, 2021

(54) COMMUNICATION APPARATUS AND COMMUNICATION SYSTEM

(71) Applicant: PANASONIC INTELLECTUAL PROPERTY MANAGEMENT CO., LTD., Osaka (JP)

(72) Inventors: Yoshikazu Nishikawa, Tokyo (JP); Yoshinao Kawai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/815,929

(22) Filed: Mar. 11, 2020

(65) Prior Publication Data

US 2020/0290633 A1 Sep. 17, 2020

(30) Foreign Application Priority Data

Mar. 14, 2019 (JP) .................................. 2019-047269

(51) Int. Cl.
*B60W 50/04* (2006.01)
*H04L 12/40* (2006.01)

(52) U.S. Cl.
CPC ........... *B60W 50/045* (2013.01); *H04L 12/40* (2013.01); *H04L 2012/40215* (2013.01); *H04L 2012/40273* (2013.01)

(58) Field of Classification Search
USPC ................................. 709/208, 203, 212, 248
See application file for complete search history.

(56) References Cited

U.S. PATENT DOCUMENTS

| 7,035,951 | B2* | 4/2006 | Bui | H04L 12/403 |
| | | | | 370/475 |
| 8,509,775 | B2* | 8/2013 | Yokota | H04W 84/02 |
| | | | | 455/436 |
| 2002/0176556 | A1* | 11/2002 | Sumiya | H04L 12/407 |
| | | | | 379/167.01 |

(Continued)

OTHER PUBLICATIONS

"DSI3 Bus Standard Revision 1.00", DSI, Feb. 16, 2011, pp. 1-45.
"NXP Semiconductor MC33SA0528 Datasheet Rev. 3.0", NXP, Jul. 2016, pp. 1-40.

*Primary Examiner* — Jude Jean Gilles
(74) *Attorney, Agent, or Firm* — Greenblum & Bernstein, P.L.C.

(57) ABSTRACT

The master apparatus includes a communicator that transmits a command to the one or more slave apparatuses in the first communication method, and that transmits a trigger to the one or more slave apparatuses and receives data that is transmitted by the one or more slave apparatuses in response to the trigger in the second communication method, and a controller that controls the communicator during execution of the first communication method to read negotiation information that indicates conditions for the second communication method from a memory and to transmit the negotiation information to the one or more slave apparatuses, wherein upon completion of communication that satisfies the conditions after the first communication method is switched to the second communication method, the controller performs switching from the second communication method to the first communication method.

20 Claims, 7 Drawing Sheets

(56) References Cited

U.S. PATENT DOCUMENTS

| | | | |
|---|---|---|---|
| 2003/0174049 A1* | 9/2003 | Beigel | G06K 19/0723 340/10.42 |
| 2008/0136908 A1* | 6/2008 | Carter | H04N 7/188 348/143 |
| 2008/0300732 A1* | 12/2008 | Luz | H04L 12/40039 701/1 |
| 2012/0250610 A1* | 10/2012 | Budampati | H04L 67/125 370/328 |
| 2014/0099944 A1* | 4/2014 | Zisimopoulos | H04W 88/06 455/426.1 |
| 2016/0088553 A1* | 3/2016 | Hirai | H04W 52/0235 370/311 |
| 2019/0023294 A1* | 1/2019 | Maeda | B60L 15/42 |
| 2020/0288285 A1* | 9/2020 | Hosobuchi | H04W 4/38 |

* cited by examiner

COMMUNICATION APPARATUS AND COMMUNICATION SYSTEM

TECHNICAL FIELD

The present disclosure relates to a communication apparatus and a communication system.

BACKGROUND ART

Conventionally, there is known a communication system in which communication is performed between a master apparatus and one or more slave apparatuses by switching between two different communication methods.

For example, Non Patent Literature (hereinafter abbreviated as "NPL") 1 discloses a communication system that uses Distributed System Interface (DSI) 3 protocol. DSI3 protocol defines two communication methods of Command and Response Mode (CRM) communication and Periodic Data Collection Mode (PDCM) communication, but does not specifically define switching means for these communication methods.

CITATION LIST

Non Patent Literature

NPL 1
 DSI3 Bus Standard Revision 1.00 Feb. 16, 2011
NPL 2
 NXP Semiconductor MC33SA0528 Datasheet Rev. 3.0, July 2016

SUMMARY

However, the communication system as described above leaves room for improvement with respect to smooth switching between the communication methods.

An object of an aspect of the present disclosure is to provide a communication apparatus and a communication system that enable smooth switching between communication methods.

A communication apparatus according to one aspect of the present disclosure is an apparatus installed on a vehicle as a master apparatus for communicating with one or more slave apparatuses installed on the vehicle, by switching between a first communication method and a second communication method, the communication apparatus including: a communicator that transmits a command to the one or more slave apparatuses in the first communication method, and that transmits a trigger to the one or more slave apparatuses and receives data that is transmitted by the one or more slave apparatuses in response to the trigger in the second communication method; and a controller that controls the communicator during execution of the first communication method to read negotiation information that indicates conditions for the second communication method from a memory and to transmit the negotiation information to the one or more slave apparatuses, wherein upon completion of communication that satisfies the conditions after the first communication method is switched to the second communication method, the controller performs switching from the second communication method to the first communication method.

A communication apparatus according to one aspect of the present disclosure is an apparatus installed on a vehicle as one or more slave apparatuses for communicating with a master apparatus installed on the vehicle, by switching between a first communication method and a second communication method, the communication apparatus including: a communicator that receives a command from the master apparatus in the first communication method, and that receives a trigger from the master apparatus and transmits data to the master apparatus in response to the trigger in the second communication method; and a controller that, during execution of the first communication method, causes negotiation information that indicates conditions for the second communication method to be stored in a memory, in a case where the negotiation information is received by the communicator, wherein upon completion of communication that satisfies the conditions after the first communication method is switched to the second communication method, the controller performs switching from the second communication method to the first communication method.

A communication system according to one aspect of the present disclosure includes: a communication apparatus that is used as the master apparatus according to one aspect of the present disclosure; and a communication apparatus that is used as the one or more slave apparatuses according to one aspect of the present disclosure.

DESCRIPTION OF EMBODIMENTS

First, findings leading to the present disclosure will be described.

Here, the communication system disclosed in NPL 1 that uses DSI3 protocol will be described as an example. As described above, DSI3 protocol defines two communication methods of CRM communication and PDCM communication. According to CRM communication, bidirectional communication can be performed between a master apparatus and a slave apparatus (one-way communication from the master apparatus to the slave apparatus is also possible). On the other hand, PDCM communication is characterized in that one-way communication from the slave apparatus to the master apparatus is performed, in a case where the slave apparatus receives a trigger from the master apparatus.

Additionally, PDCM communication enables data communication at a higher rate than CRM communication.

For example, switching from CRM communication to PDCM communication is performed by a method of transmitting, from the master apparatus to the slave apparatus, a command instructing switching from CRM communication to PDCM communication.

On the other hand, switching from PDCM communication to CRM communication is not particularly defined in NPL 1, and is performed by resetting or turning off of a master apparatus or resetting or turning off of a slave apparatus as disclosed in NPL 2. Accordingly, switching from PDCM communication to CRM communication is possibly not smoothly performed, and efficient data communication is possibly not performed.

An object of the present disclosure is to smoothly perform switching from PDCM communication to CRM communication without requiring resetting, turning off or the like of the master apparatus or the slave apparatus.

Additionally, in each embodiment of the present disclosure described below, switching between CRM communication and PDCM communication according to DSI3 protocol is described as an example, but the communication protocol is not limited to DSI3 protocol, and also, the communication methods are not limited to CRM communication and PDCM communication.

Heretofore, findings leading to the present disclosure have been described.

Hereinafter, each embodiment of the present disclosure will be described with reference to the accompanying drawings. Additionally, common structural elements in each drawing will be denoted by same reference signs, and description thereof will be omitted as appropriate.

Embodiment 1

Figure 1:
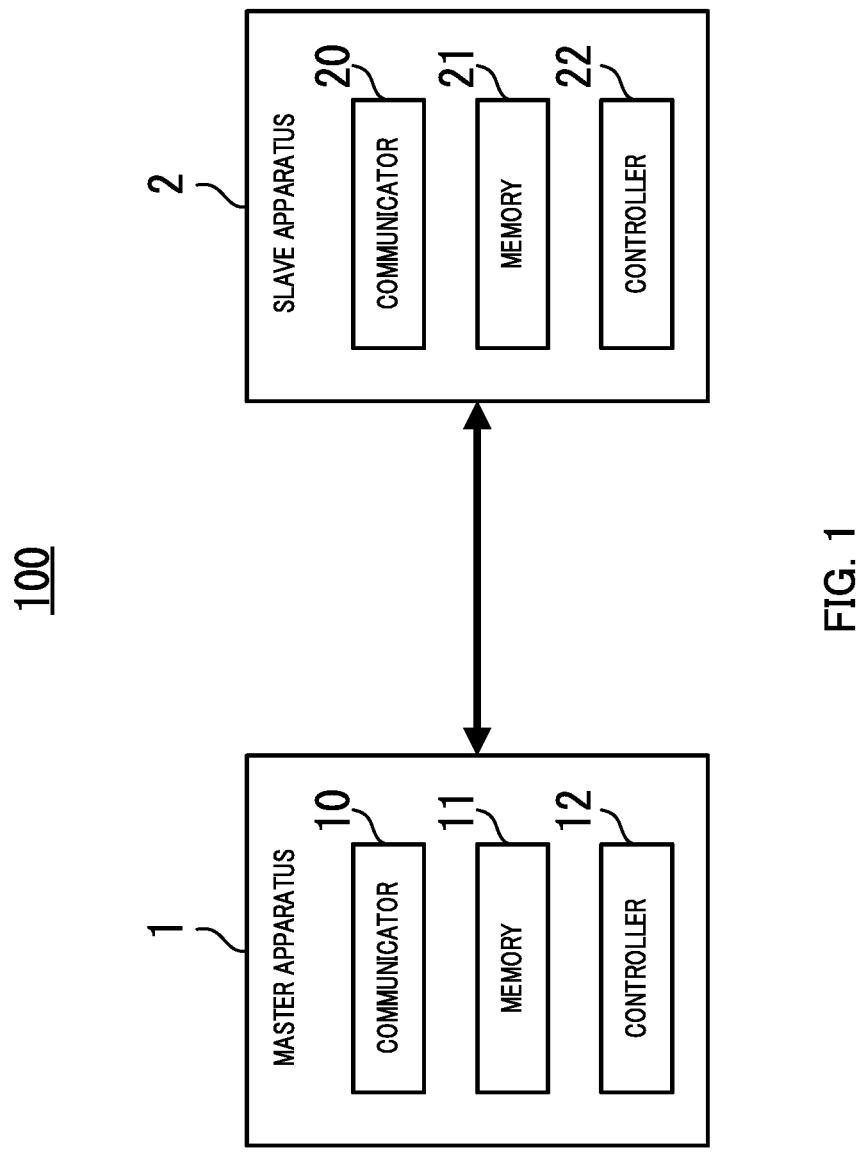
FIG. 1 is a block diagram illustrating an example configuration of a communication system, a master apparatus, and a slave apparatus according to Embodiment 1 of the present disclosure.

First, a configuration of communication system 100, master apparatus 1, and slave apparatus 2 according to the present embodiment will be described with reference to FIG. 1. FIG. 1 is a block diagram illustrating an example configuration of communication system 100, master apparatus 1, and slave apparatus 2 according to the present embodiment.

Communication system 100 illustrated in FIG. 1 is a communication system that uses DSI3 protocol. Accordingly, with communication system 100, switching between CRM communication and PDCM communication is performed.

As illustrated in FIG. 1, communication system 100 includes one master apparatus 1, and one slave apparatus 2. Master apparatus 1 and slave apparatus 2 are electrically connected to each other.

In the following, a configuration of master apparatus 1 will be described.

Master apparatus 1 is a communication apparatus including communicator 10, memory 11, and controller (control section) 12.

Communicator (communication section) 10 performs communication with slave apparatus 2.

For example, during CRM communication, communicator 10 transmits commands to slave apparatus 2 under control of controller 12. These commands include two types of a unicast command and a global command. The unicast command is a command for which there is a response from slave apparatus 2, and the global command is a command for which there is no response from slave apparatus 2.

Accordingly, in the case of transmitting a unicast command to slave apparatus 2, communicator 10 receives a response from slave apparatus 2. On the other hand, in the case of transmitting a global command to slave apparatus 2, communicator 10 does not receive a response from slave apparatus 2.

Furthermore, as the commands, an operation command that indicates conditions for operation of slave apparatus 2, a switching command for instructing slave apparatus 2 to switch from CRM communication to PDCM communication, a negotiation command that indicates conditions for PDCM communication, and the like may be cited, for example.

Furthermore, for example, during PDCM communication, communicator 10 transmits a Broadcast Read Command (BRC) trigger to slave apparatus 2 under control of controller 12. Then, communicator 10 receives data from slave apparatus 2. The data is data that is obtained by operation of slave apparatus 2, for example. The BRC trigger is defined by DSI3 protocol.

Memory 11 stores various pieces of information.

For example, memory 11 stores data received from slave apparatus 2 by communicator 10, under control of controller 12.

Furthermore, for example, memory 11 stores operation information that indicates conditions for operation of slave apparatus 2. The operation information is transmitted from communicator 10 to slave apparatus 2 in the form of an operation command.

Furthermore, for example, memory 11 stores negotiation information that indicates conditions for PDCM communication. The negotiation information is transmitted from communicator 10 to slave apparatus 2 in the form of a negotiation command.

For example, the negotiation information includes information such as a BRC trigger count (also referred to as "BRC count value"), a BRC trigger interval (also referred to as "Time between value"), a data transmission timing (also referred to as "Tx Data Timing"), and a data length (also referred to as "PDCM transmission bit number").

The BRC trigger count is the number of times the BRC trigger is transmitted (or in other words, issued).

The BRC trigger interval is a time interval between completion of transmission of a BRC trigger and completion of transmission of a next BRC trigger. Additionally, the BRC trigger interval may be a time interval between a timing of transmission of a BRC trigger and a timing of transmission of a next BRC trigger.

The data transmission timing is a timing at which slave apparatus 2 transmits data. Specifically, the data transmission timing is a time interval between completion of reception of a BRC trigger by slave apparatus 2 and start of transmission of data to master apparatus 1 by slave apparatus 2.

The data length is a length of data that is transmitted from slave apparatus 2.

Controller 12 controls communicator 10 and memory 11.

For example, during CRM communication, controller 12 controls communicator 10 such that communicator 10 reads operation information from memory 11 and transmits the operation information to slave apparatus 2 in the form of an operation command.

Furthermore, for example, during CRM communication (after a lapse of a predetermined period of time from transmission of the operation command, for example), controller 12 controls communicator 10 such that communicator 10 transmits negotiation information read from memory 11 to slave apparatus 2 in the form of a negotiation command.

Furthermore, for example, during CRM communication (after a lapse of a predetermined period of time from transmission of the negotiation command, for example), controller 12 controls communicator 10 such that communicator 10 transmits a switching command to slave apparatus 2. Moreover, after transmission of the switching command, controller 12 performs switching from CRM communication to PDCM communication.

Furthermore, for example, during PDCM communication (after a lapse of a predetermined period of time from transmission of the switching command, for example), controller 12 controls communicator 10 such that communicator 10 transmits the BRC trigger in response to the BRC trigger count and the BRC trigger interval indicated by the negotiation information.

Furthermore, for example, during PDCM communication, controller 12 causes data received from slave apparatus 2 by communicator 10 to be stored in memory 11.

Furthermore, for example, upon completion of communication according to conditions indicated by the negotiation information, controller 12 performs switching from PDCM communication to CRM communication. Specifically, once the BRC trigger is received by the number of times according to the BRC trigger count, a number of pieces of data corresponding to the BRC trigger count are received, and a time corresponding to the BRC trigger interval has passed from completion of transmission of a last BRC trigger, controller 12 performs switching from PDCM communication to CRM communication.

Heretofore, a configuration of master apparatus 1 has been described.

Next, a configuration of slave apparatus 2 will be described.

Slave apparatus 2 is a communication apparatus including communicator 20, memory 21, and controller 22.

Communicator 20 performs communication with master apparatus 1.

For example, during CRM communication, communicator 20 receives a command from master apparatus 1. Furthermore, in the case where the command is a unicast command, communicator 20 transmits a response to master apparatus 1 under control of controller 22.

Furthermore, for example, during PDCM communication, communicator 20 receives the BRC trigger from master apparatus 1. Moreover, in this case, communicator 20 transmits data to master apparatus 1 under control of controller 22.

Memory 21 stores various pieces of information.

For example, memory 21 stores operation information and negotiation information received from master apparatus 1 by communicator 20, under control of controller 22.

Furthermore, for example, memory 21 stores data obtained by operation of slave apparatus 2, under control of controller 22.

Controller 22 controls communicator 20 and memory 21.

For example, in the case where communicator 20 receives a unicast command from master apparatus 1 during CRM communication, controller 22 controls communicator 20 such that communicator 20 transmits a response to master apparatus 1.

Furthermore, for example, during CRM communication, controller 22 causes operation information received from master apparatus 1 by communicator 20 to be stored in memory 21.

Furthermore, for example, during CRM communication, controller 22 causes negotiation information received from master apparatus 1 by communicator 20 to be stored in memory 21.

Furthermore, in the case where a switching command is received from master apparatus 1 by communicator 20 during CRM communication, controller 22 performs switching from CRM communication to PDCM communication.

Furthermore, for example, in the case where a BRC trigger is received from master apparatus 1 by communicator 20 during PDCM communication, controller 22 reads data from memory 21, and processes the data to have a data length indicated by the negotiation information by performing a process such as division, combination, or bit insertion on the data. Alternatively, controller 22 may read, from memory 21, data of a data length indicated by the negotiation information. Then, controller 22 controls communicator 20 such that communicator 20 transmits the data to master apparatus 1 at a data transmission timing indicated by the negotiation information.

Furthermore, for example, upon completion of communication according to conditions indicated by the negotiation information, controller 22 performs switching from PDCM communication to CRM communication. Specifically, once the BRC trigger is received by the number of times according to the BRC trigger count, a number of pieces of data corresponding to the BRC trigger count are transmitted, and a time corresponding to the BRC trigger interval has passed from reception of a last BRC trigger, controller 22 performs switching from PDCM communication to CRM communication.

Heretofore, a configuration of slave apparatus 2 has been described.

Additionally, although not illustrated, master apparatus 1 and slave apparatus 2 each include, as hardware, a central processing unit (CPU), a read only memory (ROM) storing computer programs, and a random access memory (RAM), for example. Each function of the master apparatus and the slave apparatus described in the present embodiment and Embodiments 2, 3 described later is implemented by the CPU executing a computer program read from the ROM. Additionally, such an example is not restrictive, and master apparatus 1 and slave apparatus 2 may each be configured by a simple hardware logic not including the CPU. Alternatively, master apparatus 1 and slave apparatus 2 may be implemented as an integrated circuit (IC) where each function is built on a substrate.

Heretofore, a configuration of communication system 100 has been described.

Figure 2:
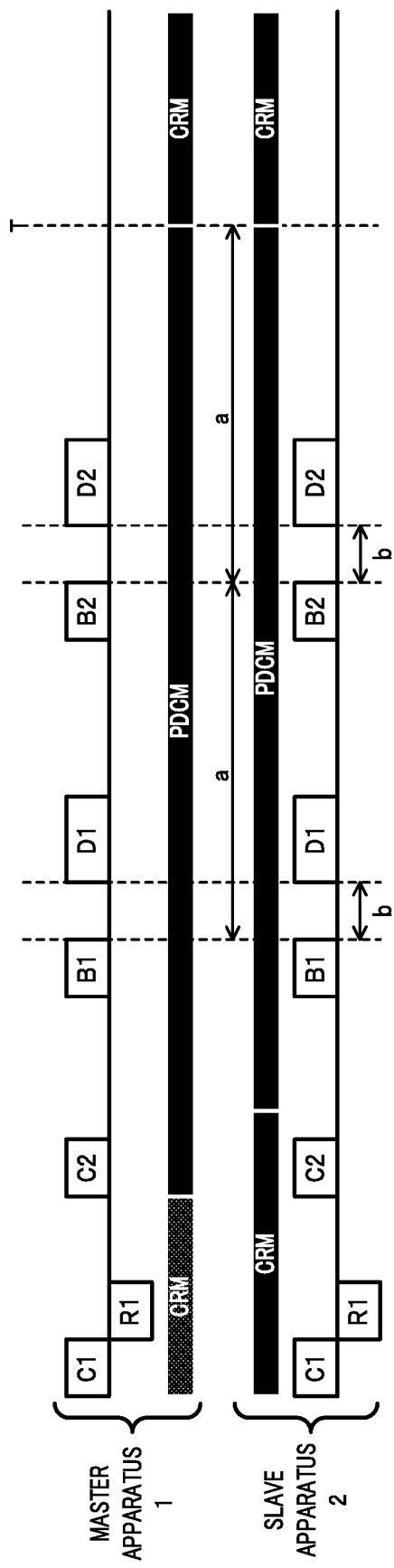
FIG. 2 is a schematic diagram illustrating example operation of the communication system according to Embodiment 1 of the present disclosure.

Next, operation of communication system 100 (master apparatus 1 and slave apparatus 2) will be described with reference to FIG. 2. FIG. 2 is a schematic diagram illustrating an example of operation of communication system 100. In FIG. 2, a time axis progresses from left to right. Furthermore, although not illustrated, data obtained by operation performed by slave apparatus 2 on the basis of an operation command (operation information) from master apparatus 1 is assumed to be stored in slave apparatus 2.

First, master apparatus 1 transmits command C1, which is a unicast command, to slave apparatus 2. Command C1 is a negotiation command (negotiation information). Here, it is assumed that the followings are defined in the negotiation information: the BRC trigger count is two; a BRC trigger interval a is 500 µs; data transmission timing b is 30 µs; and the data length is 48 bits, for example.

Next, slave apparatus 2 receives command C1. Then, slave apparatus 2 stores the negotiation information, and also, transmits response R1 to master apparatus 1. Then, master apparatus 1 receives response R1.

The communication method used up to this point is CRM communication, as illustrated in FIG. 2.

Additionally, in the description given above, a case where command C1 is a unicast command is described as an example, but command C1 may alternatively be a global command. In this case, slave apparatus 2 does not transmit a response to command C1. Furthermore, in the description given above, there may be several negotiation commands C1.

Next, master apparatus 1 transmits command C2, which is a global command, to slave apparatus 2, and also, performs switching from CRM communication to PDCM communication. Command C2 is a switching command instructing switching from CRM communication to PDCM communication.

Next, slave apparatus 2 receives command C2. Triggered by the command, slave apparatus 2 performs switching from CRM communication to PDCM communication.

Additionally, in the description given above, a case where command C2 is a global command is described as an example, but command C2 may alternatively be a unicast command. In this case, slave apparatus 2 performs transmission of a response to command C2.

Next, master apparatus 1 transmits BRC trigger B1 to slave apparatus 2.

Next, slave apparatus 2 receives BRC trigger B1. Slave apparatus 2 thus transmits data D1 to master apparatus 1 according to data transmission timing b indicated by the negotiation information. Data D1 has a data length indicated by the negotiation information.

Next, master apparatus 1 receives data D1 from slave apparatus 2, and stores data D1.

Next, master apparatus 1 transmits BRC trigger B2 to slave apparatus 2 in response to BRC trigger interval a indicated by the negotiation information.

Then, slave apparatus 2 receives BRC trigger B2. Slave apparatus 2 thus transmits data D2 to master apparatus 1 according to data transmission timing b indicated by the negotiation information. Data D2 has a data length indicated by the negotiation information.

Then, master apparatus 1 receives data D2 from slave apparatus 2, and stores data D2.

Then, upon completion of communication that satisfies the conditions indicated by the negotiation information, master apparatus 1 and slave apparatus 2 perform switching from PDCM communication to CRM communication at timing T. For example, timing T is a time point when BRC trigger interval a elapses from completion of transmission of BRC trigger B2 by master apparatus 1 (that is, the time of reception of BRC trigger B2, from the standpoint of slave apparatus 2). Additionally, in the description given above, a case where the number of times of the BRC trigger is two is described as an example, but the BRC trigger count is also treated as the negotiation information, and thus, the number of times may be one or three or more.

Heretofore, operation of communication system 100 has been described.

As described above, in the present embodiment, negotiation about the conditions for PDCM communication is performed in advance during CRM communication by master apparatus 1 transmitting the negotiation information to slave apparatus 2. Then, upon completion of communication that satisfies the negotiated conditions after switching of CRM communication to PDCM communication, master apparatus 1 and slave apparatus 2 both perform switching from PDCM communication to CRM communication. Accordingly, in the present embodiment, switching from PDCM communication to CRM communication may be smoothly performed without requiring resetting of master apparatus 1, turning off of slave apparatus 2, and the like. Efficient data communication may thus be performed.

Embodiment 2

In Embodiment 1, a case where the communication system includes one slave apparatus is described as an example, but the communication system may alternatively include the two or more slave apparatuses. In the present embodiment, a case where the communication system includes one master apparatus and the two or more slave apparatuses will be described as an example.

Figure 3:
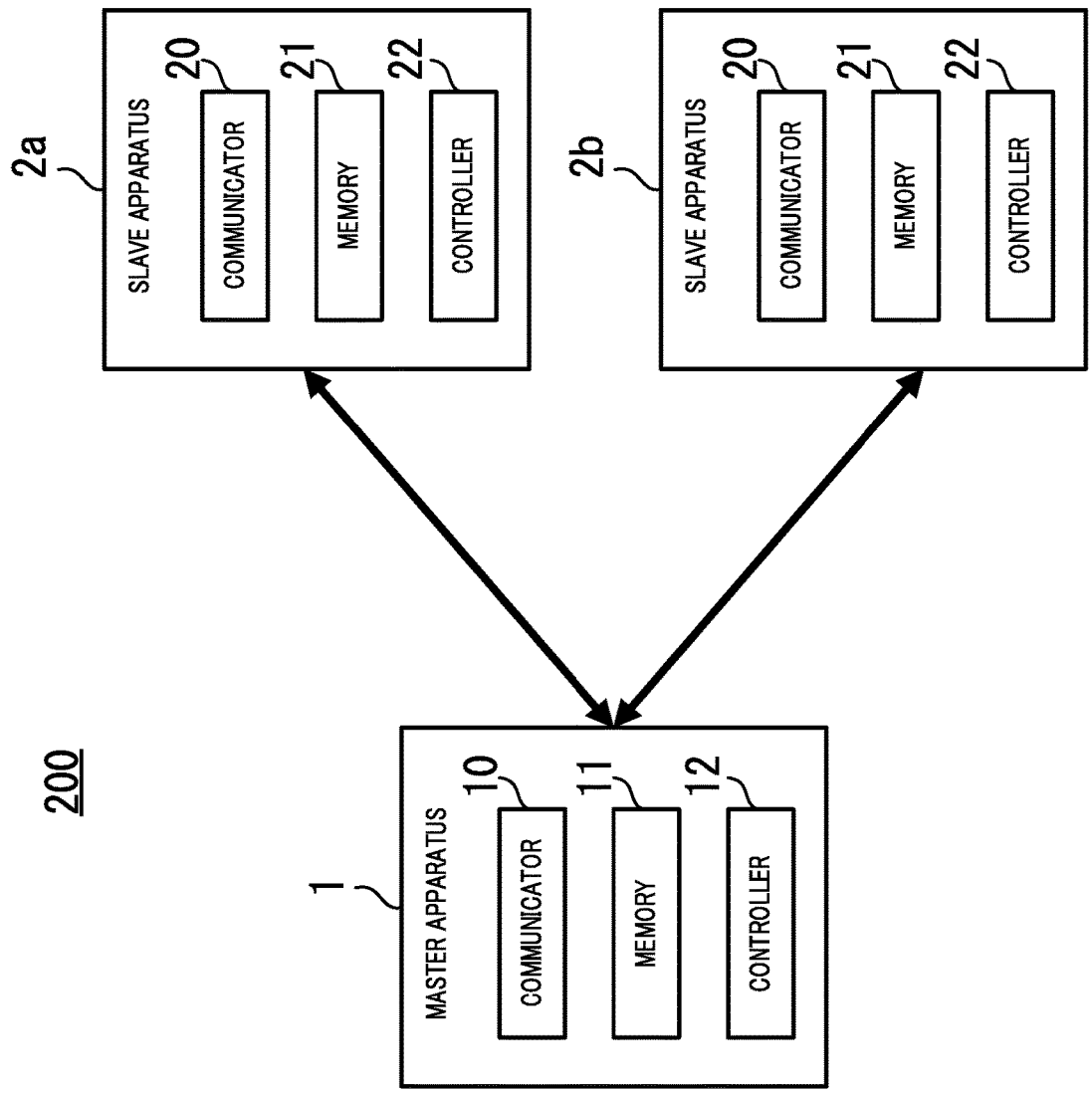
FIG. 3 is a block diagram illustrating an example configuration of a communication system, a master apparatus, and slave apparatuses according to Embodiment 2 of the present disclosure.

First, a configuration of communication system 200, master apparatus 1, and slave apparatuses 2a, 2b according to the present embodiment will be described with reference to FIG. 3. FIG. 3 is a block diagram illustrating an example configuration of communication system 200, master apparatus 1, and slave apparatuses 2a, 2b according to the present embodiment.

Communication system 200 illustrated in FIG. 3 is a communication system that uses DSI3 protocol. Accordingly, with communication system 200, switching between CRM communication and PDCM communication is performed.

Figure 7:
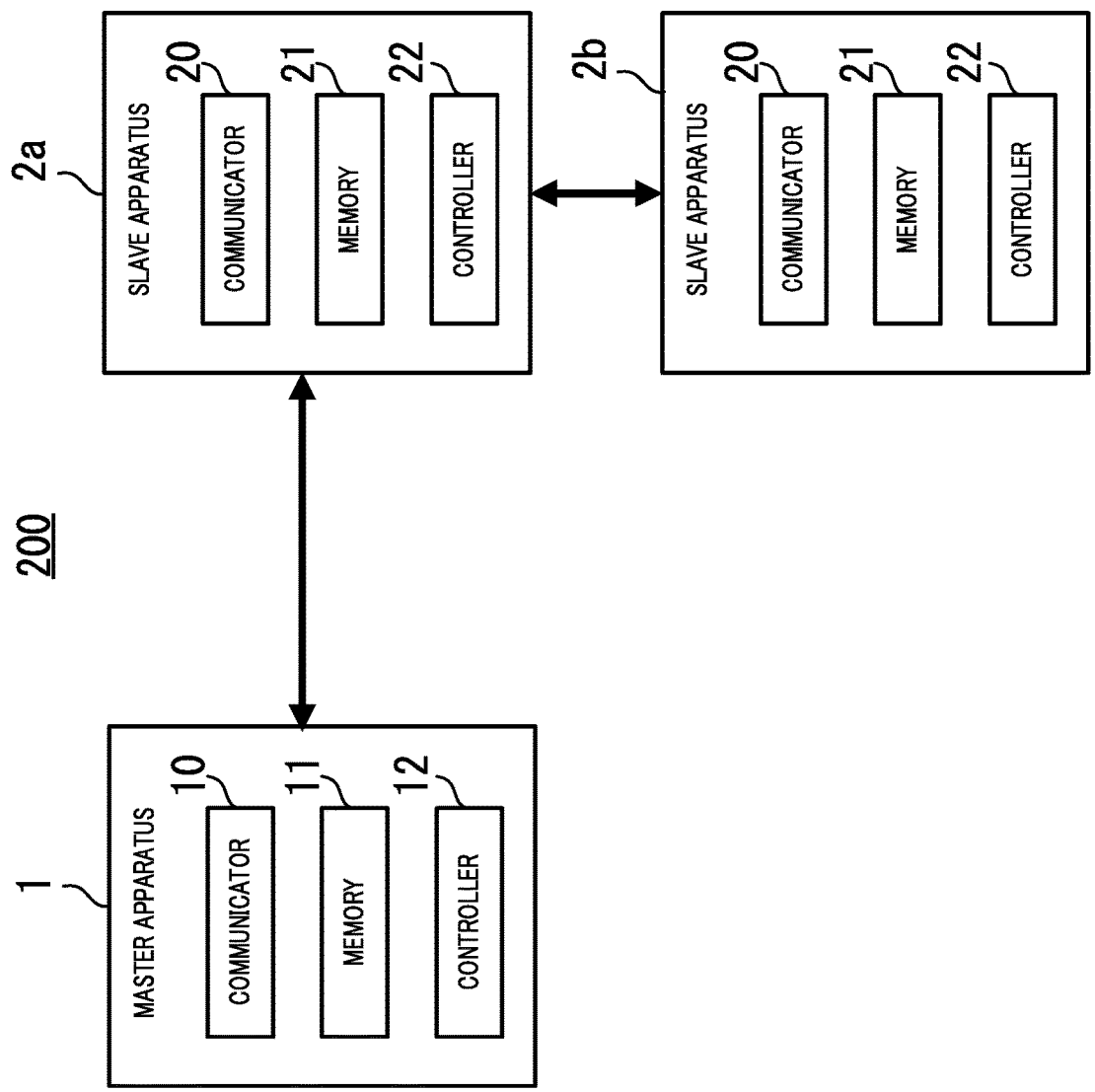
FIG. 7 is a block diagram illustrating an example configuration of the communication system, the master apparatus, and the slave apparatuses according to Embodiment 2 of the present disclosure.

As illustrated in FIG. 3, communication system 200 includes one master apparatus 1, and two slave apparatuses 2a, 2b. Master apparatus 1 and slave apparatuses 2a, 2b are electrically connected to each other. FIG. 3 illustrates a case where a connection method between master apparatus 1 and slave apparatuses 2a, 2b is bus connection (parallel connection) as an example, but such a case is not restrictive, and daisy chain connection (serial connection) as illustrated in FIG. 7, for example, may also be adopted.

Additionally, the present embodiment describes, as an example, a case where the number of slave apparatuses is two, but the number of slave apparatuses may be two or more.

As illustrated in FIG. 3, master apparatus 1 includes communicator 10, memory 11, and controller 12, and slave apparatuses 2a, 2b each include communicator 20, memory 21, and controller 22. Each unit is as described in Embodiment 1, and description thereof will be omitted.

Heretofore, a configuration of communication system 200 has been described.

Figure 4:
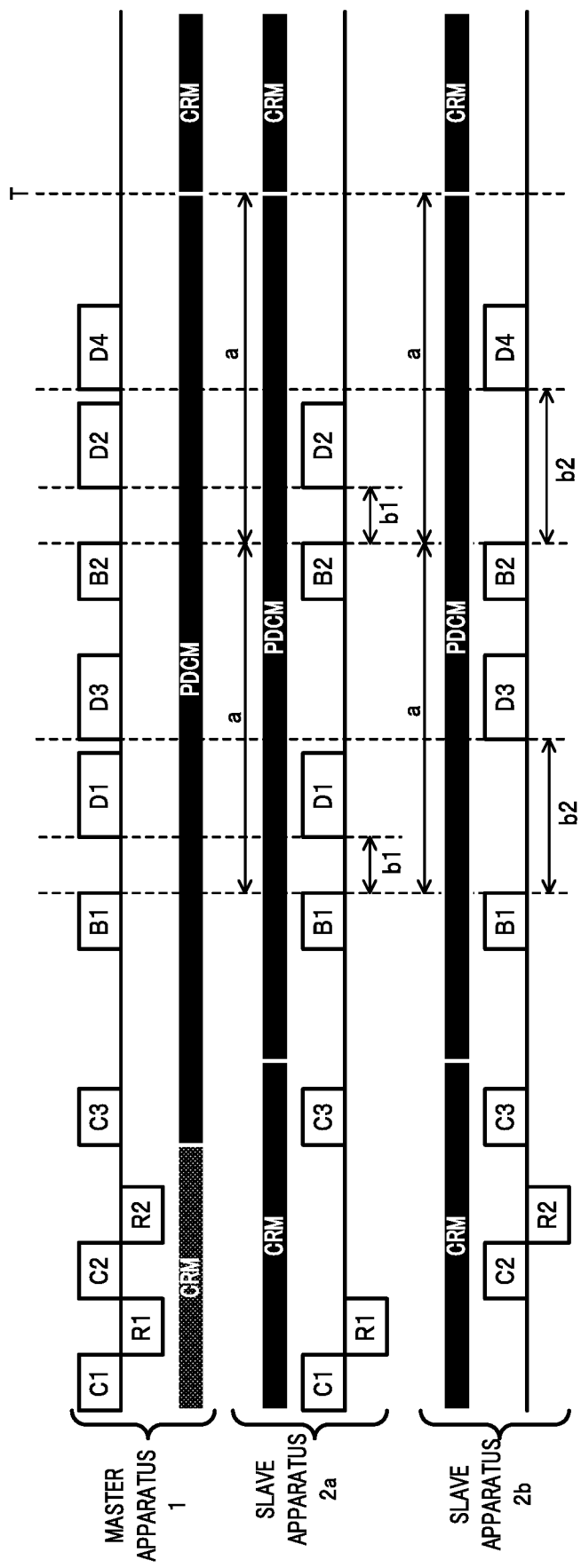
FIG. 4 is a schematic diagram illustrating example operation of the communication system according to Embodiment 2 of the present disclosure.

Next, operation of communication system 200 (master apparatus 1 and slave apparatuses 2a, 2b) will be described with reference to FIG. 4. FIG. 4 is a schematic diagram illustrating an example of operation of communication system 200. In FIG. 4, a time axis progresses from left to right. Furthermore, although not illustrated, data obtained by operation performed by each slave apparatus 2a, 2b on the basis of an operation command (operation information) from master apparatus 1 is assumed to be stored in each slave apparatus 2a, 2b.

First, master apparatus 1 transmits command C1 and command C2 to slave apparatuses 2a, 2b, command C1 being for slave apparatus 2a, command C2 being for slave apparatus 2b.

Commands C1, C2 each include information that indicates a destination (such as identification information of the slave apparatus). Accordingly, slave apparatuses 2a, 2b may each recognize a command addressed to itself, among received commands C1, C2.

Commands C1, C2 are both negotiation commands (negotiation information) that are transmitted by unicast commands.

It is assumed that the followings are defined in the negotiation information in command C1: a BRC trigger count is two; BRC trigger interval a is 500 μs; data transmission timing b1 is 30 μs; and a data length is 48 bits, for example.

It is assumed that the followings are defined in the negotiation information in command C2: a BRC trigger count is two; BRC trigger interval a is 500 μs; data transmission timing b2 is 200 μs; and a data length is 48 bits, for example.

That is, data transmission timing b1 in the negotiation information for slave apparatus 2a and data transmission timing b2 in the negotiation information for slave apparatus 2b are different from each other.

Additionally, command C1 and command C2 may each be divided and transmitted over a plurality of times.

Next, slave apparatus 2a receives commands C1, C2, and recognizes that command C1, of the two commands, is a command addressed to itself. Then, slave apparatus 2a stores the negotiation information, and also, transmits response R1 for command C1 to master apparatus 1. Then, master apparatus 1 receives response R1.

Furthermore, slave apparatus 2b receives commands C1, C2, and recognizes that command C2, of the two commands, is a command addressed to itself. Then, slave apparatus 2b stores the negotiation information, and also, transmits response R2 for command C2 to master apparatus 1. Then, master apparatus 1 receives response R2.

The communication method used up to this point is CRM communication, as illustrated in FIG. 4.

Additionally, in the description given above, a case where master apparatus 1 transmits commands C1, C2, which are negotiation commands, to slave apparatuses 2a, 2b using the unicast commands is described as an example, but such a case is not restrictive. For example, master apparatus 1 may transmit commands C1, C2, which are negotiation commands, simultaneously to slave apparatuses 2a, 2b using the global commands. In this case, it is possible to use a method of using the global command only for common parts of the pieces of negotiation information, and of using the unicast commands for different parts (such as the data transmission timing) of the pieces of negotiation information. It is also possible to use a method of using only the global command, by enabling identification of the commands for each slave apparatus 2a, 2b in the global command.

Next, master apparatus 1 transmits command C3, which is a global command, to slave apparatuses 2a, 2b, and also, performs switching from CRM communication to PDCM communication. Command C3 is a switching command instructing switching from CRM communication to PDCM communication.

Next, slave apparatuses 2a, 2b each receive command C3. Slave apparatuses 2a, 2b thereby each perform switching from CRM communication to PDCM communication.

Next, master apparatus 1 transmits BRC trigger B1 to slave apparatuses 2a, 2b.

Next, slave apparatuses 2a, 2b each receive BRC trigger B1.

Slave apparatus 2a thus transmits data D1 to master apparatus 1 according to data transmission timing b1 indicated by the negotiation information. Data D1 has a data length indicated by the negotiation information.

Furthermore, slave apparatus 2b transmits data D3 to master apparatus 1 according to data transmission timing b2 indicated by the negotiation information. Data D3 has a data length indicated by the negotiation information.

Next, master apparatus 1 receives data D1 from slave apparatus 2a, and then, receives data D3 from slave apparatus 2b. Then, master apparatus 1 stores data D1, D3.

Next, master apparatus 1 transmits BRC trigger B2 to slave apparatuses 2a, 2b in response to BRC trigger interval a indicated by the negotiation information.

Then, slave apparatuses 2a, 2b each receive BRC trigger B2.

Slave apparatus 2a thus transmits data D2 to master apparatus 1 according to data transmission timing b1 indicated by the negotiation information. Data D2 has a data length indicated by the negotiation information.

Furthermore, slave apparatus 2b transmits data D4 to master apparatus 1 according to data transmission timing b2 indicated by the negotiation information. Data D4 has a data length indicated by the negotiation information.

Next, master apparatus 1 receives data D2 from slave apparatus 2a, and then, receives data D4 from slave apparatus 2b. Then, master apparatus 1 stores data D2, D4.

Then, master apparatus 1 and slave apparatuses 2a, 2b perform switching from PDCM communication to CRM communication at timing T. For example, timing T is a time point when BRC trigger interval a elapses from completion of transmission of BRC trigger B2 by master apparatus 1 (that is, the time of reception of BRC trigger B2, from the standpoint of slave apparatuses 2a, 2b).

Heretofore, operation of communication system 200 has been described.

As described above, in the present embodiment, negotiation about the conditions for PDCM communication is performed in advance during CRM communication by master apparatus 1 transmitting the negotiation information to slave apparatuses 2a, 2b. Then, upon completion of communication that satisfies the negotiated conditions after switching of CRM communication to PDCM communication, master apparatus 1 and slave apparatuses 2a, 2b all perform switching from PDCM communication to CRM communication. Accordingly, in the present embodiment, switching from PDCM communication to CRM communication may be smoothly performed without requiring resetting of master apparatus 1, turning off of slave apparatuses 2a, 2b, and the like. Efficient data communication may thus be performed. Additionally, in the description given above, a case where the number of times of the BRC trigger is two is described as an example, but the BRC trigger count is also treated as the negotiation information, and thus, the number of times may be one or three or more.

Embodiment 3

In the present embodiment, a case where the communication system described in Embodiment 2 (that is, the communication system to which one master apparatus and the two or more slave apparatuses are connected) is used in a vehicle will be described as an example.

Figure 5:
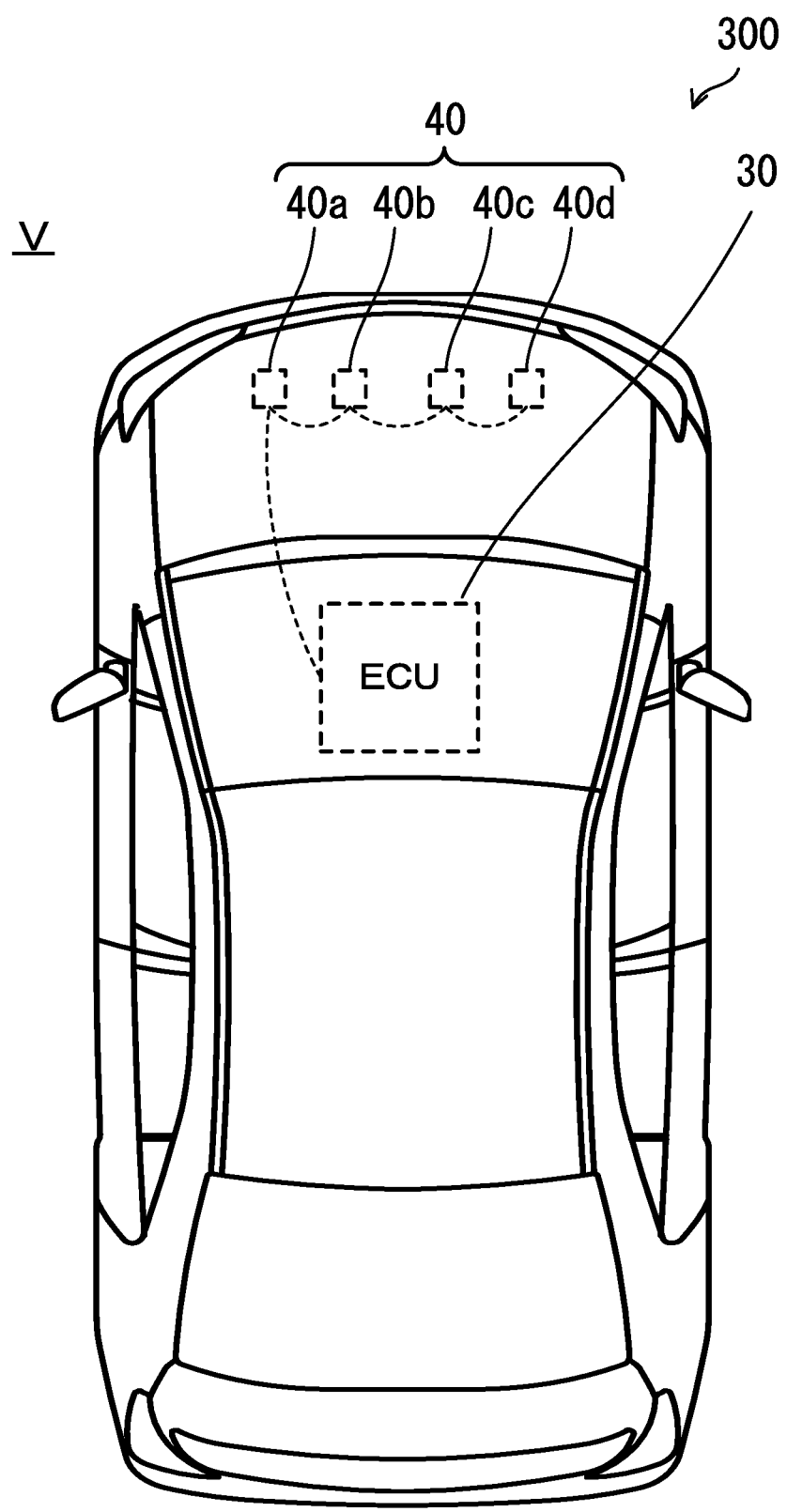
FIG. 5 is a schematic diagram illustrating an example of a communication system and a vehicle according to Embodiment 3 of the present disclosure.

First, a configuration of communication system 300 of the present embodiment will be described with reference to FIG. 5. FIG. 5 is a schematic diagram illustrating an example of communication system 300 and vehicle V of the present embodiment. FIG. 5 illustrates a state where vehicle V is viewed from directly above. Vehicle V illustrated in FIG. 5 is, but not limited to, a passenger vehicle, for example, and may be a commercial vehicle such as a truck or a bus.

As illustrated in FIG. 5, communication system 300 is installed on vehicle V. Communication system 300 includes electronic control unit (ECU) 30, and sonar sensor group 40. Sonar sensor group 40 includes sonar sensors 40a, 40b, 40c, 40d.

ECU 30 corresponds to an example of the master apparatus described in Embodiment 2. Furthermore, sonar sensors 40a, 40b, 40c, 40d each correspond to an example of the slave apparatus described in Embodiment 2.

As illustrated in FIG. 5, ECU 30 and sonar sensors 40a, 40b, 40c, 40d are electrically connected to one another by daisy chain connection.

For example, sonar sensors 40a, 40b, 40c, 40d are ultrasonic sonar sensors that performs sensing of a forward side of vehicle V. An ultrasonic sonar sensor may transmit sound waves itself and measure reflected waves, or may measure reflected waves of sound waves transmitted by another sensor without transmitting sound waves itself. For example, one of sonar sensors 40a, 40b, 40c, 40d transmits sound waves, and the other three perform measurement of reflected waves. Accordingly, setting has to be performed regarding operation of each sonar sensor 40a, 40b, 40c, 40d at each time of sensing. Such setting of operation is performed by ECU 30 transmitting an operation command (operation information) to each sonar sensor 40a, 40b, 40c, 40d during CRM communication.

It is also possible for one of sonar sensors 40a, 40b, 40c, 40d to transmit sound waves, and for all of sonar sensors 40a, 40b, 40c, 40d including the sonar sensor that transmitted the sound waves to measure the reflected waves. Also in this case, the number of sonar sensors that transmit sound waves is one, and thus, the operation command (operation information) is transmitted to each sonar sensor 40a, 40b, 40c, 40d. The combination of a sensor that transmits waves and a sensor that performs measurement is not limited to the example described above.

Furthermore, in the present embodiment, a case where the number of sonar sensors is four is described as an example, but the number of sonar sensors is not limited to this. Moreover, in the present embodiment, a case where the sonar sensor is a sonar sensor that performs sensing of a forward side of a vehicle is described as an example, but the sonar sensor may alternatively be a sonar sensor that performs sensing of a rear side, a left side, a right side, or other positions of the vehicle. Moreover, in the present embodiment, a case where an example of the slave apparatus is the ultrasonic sonar sensor is described as an example, but such an example is not restrictive, and the slave apparatus may be other in-vehicle devices that perform communication with ECU 30.

Heretofore, a configuration of communication system 300 has been described.

Figure 6:
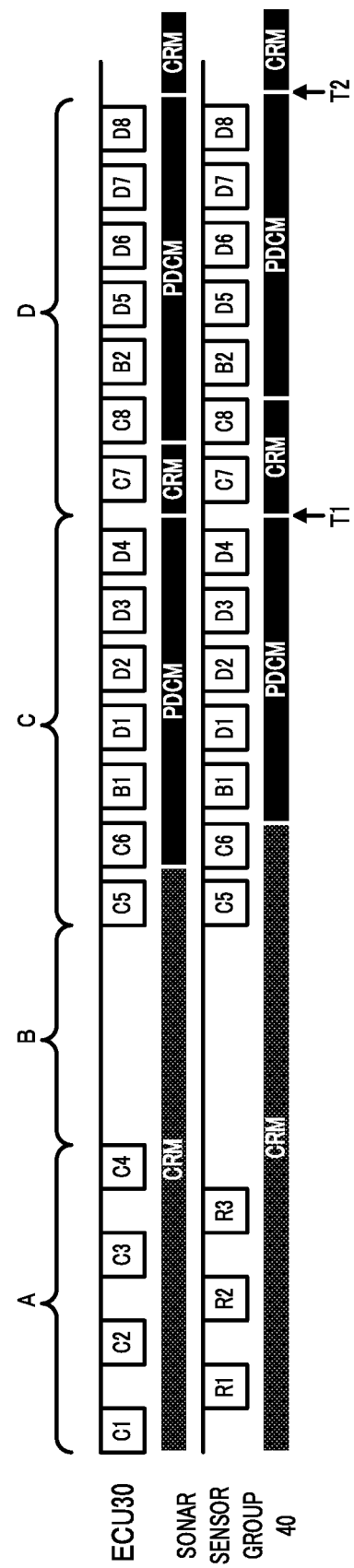
FIG. 6 is a schematic diagram illustrating example operation of the communication system according to Embodiment 3 of the present disclosure.

Next, operation of communication system 300 (ECU 30 and sonar sensor group 40) will be described with reference to FIG. 6. FIG. 6 is a schematic diagram illustrating an example of operation of communication system 300. In FIG. 6, a time axis progresses from left to right.

Operation in period A will be described. Period A is a period when ECU 30 controls sonar sensor group 40.

First, ECU 30 transmits commands C1 to C3, which are operation commands (operation information), to each sonar sensor 40a, 40b, 40c, 40d. For example, commands C1 to C3 are unicast commands. Additionally, here, a case where commands C1 to C3 are unicast commands is described as an example, but commands C1 to C3 may alternatively be global commands. Furthermore, commands C1 to C3 are divided and transmitted over a plurality of times.

For example, commands C1 to C3 set an instruction to transmit sound waves, conditions for transmission, and the like for a sonar sensor that is to transmit sound waves, and set an instruction to measure reflected waves, conditions for measurement, and the like for a sonar sensor that is to measure reflected waves.

Next, sonar sensors 40a, 40b, 40c, 40d each receive commands C1 to C3. Then, sonar sensors 40a, 40b, 40c, 40d each store the operation information, and also, transmit responses R1 to R3 to ECU 30. Then, master apparatus 1 receives responses R1 to R3 (not illustrated).

Next, ECU 30 transmits command C4, which is an operation command (operation information), to each sonar sensor 40a, 40b, 40c, 40d. For example, command C4 is a global command, and is a command that instructs start of transmission of sound waves.

Next, sonar sensors 40a, 40b, 40c, 40d receive command C4. Then, in period B described later, a sonar sensor, among sonar sensors 40a, 40b, 40c, 40d, which is instructed to transmit sound waves starts transmission of sound waves, and a sonar sensor that is instructed to measure reflected waves starts measurement of reflected waves. In this manner, a timing of start of transmission of sound waves and a timing of start of measurement of reflected waves are synchronized by command C4.

Operation in period B will be described. Period B is a period when sonar sensor group 40 performs sensing.

First, sonar sensors 40a, 40b, 40c, 40d perform sensing on the basis of the operation information. As described above, this sensing is operation of a sonar sensor transmitting sound waves itself and measuring reflected waves, or operation of a sonar sensor measuring reflected waves of sound waves transmitted by another sensor without transmitting sound waves itself.

Next, sonar sensors 40a, 40b, 40c, 40d store data obtained by sensing.

Operation in period C will be described. Period C is a period when ECU 30 receives first data from sonar sensor group 40.

First, ECU 30 transmits command C5, which is a unicast command, to sonar sensor 40a, 40b, 40c, 40d.

Command C5 is a negotiation command (negotiation information) specifying the BRC trigger count, the BRC trigger interval, the data transmission timing, and the data length. Here, the specified data length is assumed to be 48 bits, for example. Furthermore, the data transmission timing takes a different value in command C5 transmitted to each sonar sensor 40a, 40b, 40c, 40d.

Next, sonar sensor 40a, 40b, 40c, 40d receives and stores command C5 (negotiation information). Then, sonar sensor 40a, 40b, 40c, 40d transmits a response to ECU 30, and ECU 30 receives each response (not illustrated).

Additionally, in the description given above, a case where ECU 30 transmits command C5, which is a negotiation command, to each sonar sensor 40a, 40b, 40c, 40d using a unicast command is described as an example, but ECU 30 may simultaneously transmit command C5, which is a negotiation command, to each sonar sensor 40a, 40b, 40c, 40d alternatively using a global command. In this case, it is possible to use a method of using a global command only for common parts of the pieces of negotiation information, and of using the unicast commands for different parts (such as the data transmission timing) of the pieces of negotiation information. It is also possible to use a method of using only the global command, by enabling identification of a command for each sonar sensor in the global command.

The communication method used up to this point is CRM communication, as illustrated in FIG. 6.

Next, ECU 30 transmits command C6, which is a global command, to sonar sensors 40*a*, 40*b*, 40*c*, 40*d*, and also, performs switching from CRM communication to PDCM communication.

Command C6 is a switching command instructing switching from CRM communication to PDCM communication.

Next, sonar sensors 40*a*, 40*b*, 40*c*, 40*d* receive command C6. Sonar sensors 40*a*, 40*b*, 40*c*, 40*d* thus perform switching from CRM communication to PDCM communication.

Next, ECU 30 transmits BRC trigger B1 to sonar sensors 40*a*, 40*b*, 40*c*, 40*d*.

Next, sonar sensors 40*a*, 40*b*, 40*c*, 40*d* receive BRC trigger B1.

Sonar sensors 40*a*, 40*b*, 40*c*, 40*d* then transmit data D1 to D4 to ECU 30, which are header information (information that indicates the number of pieces of data to be received by ECU 30, for example). Data D1 to D4 are transmitted according to the data transmission timings indicated by the negotiation information. Furthermore, data D1 to D4 have a data length (48 bits) indicated by the negotiation information.

Next, ECU 30 receives and stores data D1 to D4.

Then, upon completion of communication that satisfies the conditions indicated by the negotiation information, ECU 30 and sonar sensors 40*a*, 40*b*, 40*c*, 40*d* perform switching from PDCM communication to CRM communication at timing T1. For example, timing T1 is a time point when the BRC trigger interval indicated by the negotiation information elapses from completion of transmission of BRC trigger B1 by ECU 30 (that is, the time of reception of BRC trigger B1, from the standpoint of sonar sensor group 40).

Next, operation in period D will be described. Period D is a period when ECU 30 receives, from sonar sensor group 40, data following data D1 to D4.

First, ECU 30 transmits command C7, which is a unicast command, to sonar sensor 40*a*, 40*b*, 40*c*, 40*d*.

Command C7 is a negotiation command (negotiation information) specifying the BRC trigger count, the BRC trigger interval, the data transmission timing, and the data length. Here, the specified data length is assumed to be 128 bits, for example. Furthermore, the data transmission timing takes a different value in command C7 transmitted to each sonar sensor 40*a*, 40*b*, 40*c*, 40*d*.

Next, sonar sensor 40*a*, 40*b*, 40*c*, 40*d* receives and stores command C7 (negotiation information). Then, sonar sensor 40*a*, 40*b*, 40*c*, 40*d* transmits a response to ECU 30, and ECU 30 receives each response (not illustrated).

Additionally, in the description given above, a case where ECU 30 transmits command C7, which is a negotiation command, to each sonar sensor 40*a*, 40*b*, 40*c*, 40*d* using a unicast command is described as an example, but ECU 30 may simultaneously transmit command C7, which is a negotiation command, to each sonar sensor 40*a*, 40*b*, 40*c*, 40*d* using a global command. In this case, it is possible to use a method of using a global command only for common parts of the pieces of negotiation information, and of using the unicast commands for different parts (such as the data transmission timing) of the pieces of negotiation information. It is also possible to use a method of using only the global command, by enabling identification of a command for each sonar sensor in the global command.

The communication method used up to this point is CRM communication, as illustrated in FIG. 6.

Next, ECU 30 transmits command C8, which is a global command, to sonar sensors 40*a*, 40*b*, 40*c*, 40*d*, and also, performs switching from CRM communication to PDCM communication.

Command C8 is a switching command instructing switching from CRM communication to PDCM communication.

Next, sonar sensors 40*a*, 40*b*, 40*c*, 40*d* receive command C8. Sonar sensors 40*a*, 40*b*, 40*c*, 40*d* thus perform switching from CRM communication to PDCM communication.

Next, ECU 30 transmits BRC trigger B2 to sonar sensors 40*a*, 40*b*, 40*c*, 40*d*.

Next, sonar sensors 40*a*, 40*b*, 40*c*, 40*d* receive BRC trigger B2.

Sonar sensors 40*a*, 40*b*, 40*c*, 40*d* thereby transmit, to ECU 30, data D5 to D8, which are information that indicates measurement results of reflected waves. Data D5 to D8 are transmitted according to the data transmission timings indicated by the negotiation information. Furthermore, data D5 to D8 have a data length (128 bits) indicated by the negotiation information.

Next, ECU 30 receives and stores data D5 to D8.

Next, ECU 30 and sonar sensors 40*a*, 40*b*, 40*c*, 40*d* perform switching from PDCM communication to CRM communication at timing T2. For example, timing T2 is a time point when the BRC trigger interval indicated by the negotiation information elapses from completion of transmission of BRC trigger B2 by ECU 30 (that is, the time of reception of BRC trigger B2, from the standpoint of sonar sensor group 40).

As described above, data D1 to D8 that are transmitted from sonar sensor group 40 to ECU 30 have large data sizes, and thus, PDCM communication by which data communication can be performed at a higher rate than by CRM communication is used for transmission of data D1 to D8.

Furthermore, because the data length of data D1 to D4, which are header information, and the data length of data D5 to D8 that indicates measurement results of reflected waves are different from each other, as described above, ECU 30 sets different values for the data length to be specified by first negotiation information (command C5 illustrated in FIG. 6) and the data length to be specified by next negotiation information (command C7 illustrated in FIG. 6).

Heretofore, operation of communication system 300 has been described.

As described above, according to the present embodiment, in the case where ECU 30 and sonar sensor group 40 installed on vehicle V perform communication using DSI3 protocol, switching from PDCM communication to CRM communication may be smoothly performed without requiring resetting of ECU 30, turning off of sonar sensor group 40, and the like. Efficient data communication may thus be performed.

Additionally, the present disclosure is not limited to each embodiment described above, and various modifications may be made within the scope of the present disclosure.

For example, each embodiment described above describes a case where each function of the master apparatus and the slave apparatus is implemented by software in coordination with hardware, but each function of the master apparatus and the slave apparatus may alternatively be implemented by hardware.

Furthermore, each embodiment described above describes a case where the master apparatus and the slave apparatus include a memory, but each memory may alternatively be provided outside the master apparatus and the slave apparatus (but inside vehicle V). In the embodiments described above, the term "section" used to indicate each constituent element may be interchangeably referred to as any other term such as "circuit (circuitry)", "device", "unit", or "module".

<Summary of Present Disclosure>

The present disclosure is summarized as follows.

A communication apparatus according to the present disclosure is an apparatus installed on a vehicle as a master apparatus for communicating with one or more slave apparatuses installed on the vehicle, by switching between a first communication method and a second communication method, the communication apparatus including: a communicator that transmits a command to the one or more slave apparatuses in the first communication method, and that transmits a trigger to the one or more slave apparatuses and receives data that is transmitted by the one or more slave apparatuses in response to the trigger in the second communication method; and a controller that controls the communicator during execution of the first communication method to read negotiation information that indicates conditions for the second communication method from a memory and to transmit the negotiation information to the one or more slave apparatuses, in which upon completion of communication that satisfies the conditions after the first communication method is switched to the second communication method, the controller performs switching from the second communication method to the first communication method.

A communication apparatus according to the present disclosure is an apparatus installed on a vehicle as one or more slave apparatuses for communicating with a master apparatus installed on the vehicle, by switching between a first communication method and a second communication method, the communication apparatus including: a communicator that receives a command from the master apparatus in the first communication method, and that receives a trigger from the master apparatus and transmits data to the master apparatus in response to the trigger in the second communication method; and a controller that, during execution of the first communication method, causes negotiation information that indicates conditions for the second communication method to be stored in a memory, in a case where the negotiation information is received by the communicator, in which upon completion of communication that satisfies the conditions after the first communication method is switched to the second communication method, the controller performs switching from the second communication method to the first communication method.

In the communication apparatus according to the present disclosure, the negotiation information includes information that indicates the number of times of transmission of the trigger.

In the communication apparatus according to the present disclosure, the negotiation information includes information that indicates a time interval between completion of transmission of the trigger and completion of transmission of a next trigger.

In the communication apparatus according to the present disclosure, the negotiation information includes information that indicates a timing of transmission of the data.

In the communication apparatus according to the present disclosure, the negotiation information includes information that indicates a length of the data.

In the communication apparatus according to the present disclosure, in a case where the vehicle includes the two or more slave apparatuses, the timing of transmission of the data is different in the negotiation information that is transmitted from the master apparatus to each of the two or more slave apparatuses.

In the communication apparatus according to the present disclosure, in a case where the vehicle includes the two or more slave apparatuses, the master apparatus and the two or more slave apparatuses are connected by daisy chain connection or bus connection.

In the communication apparatus according to the present disclosure, the first communication method is Command and Response Mode (CRM) communication, the second communication method is Periodic Data Collection Mode (PDCM) communication, and the trigger is a Broadcast Read Command (BRC) trigger.

In the communication apparatus according to the present disclosure, the CRM communication, the PDCM communication, and the BRC trigger are defined by Distributed System Interface (DSI) 3 protocol.

In the communication apparatus according to the present disclosure, the one or more slave apparatuses is an ultrasonic sonar sensor.

A communication system according to the present disclosure includes: a communication apparatus that is used as the master apparatus according to the present disclosure; and a communication apparatus that is used as the one or more slave apparatuses according to the present disclosure.

According to the present disclosure, switching between communication methods may be smoothly performed.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2019-047269, filed on Mar. 14, 2019, the disclosure of which including the specification, drawings and abstract is incorporated herein by reference in its entirety.

INDUSTRIAL APPLICABILITY

The communication apparatus and the communication system of the present disclosure are suitably used as a technique of switching between two different communication methods.

REFERENCE SIGNS LIST

1 Master apparatus
2, 2a, 2b Slave apparatus
10, 20 Communicator
11, 21 Memory
12, 22 Controller
30 ECU
40 Sonar sensor group
40a, 40b, 40c, 40d Sonar sensor
100, 200, 300 Communication system
V Vehicle

The invention claimed is:

1. A communication apparatus installed on a vehicle as a master apparatus for communicating with one or more slave apparatuses installed on the vehicle, by switching between a first communication method and a second communication method, the communication apparatus comprising:

a communicator that transmits a command to the one or more slave apparatuses in the first communication method, and that transmits a trigger to the one or more slave apparatuses and receives data that is transmitted by the one or more slave apparatuses in response to the trigger in the second communication method; and a controller that controls the communicator during execution of the first communication method to read negotiation information that indicates conditions for the second communication method from a memory and to transmit the negotiation information to the one or more slave apparatuses, wherein upon completion of communication that satisfies the conditions after the first communication method is switched to the second communication method, the controller performs switching from the second communication method to the first communication method.

2. The communication apparatus according to claim 1, wherein the negotiation information includes information that indicates the number of times of transmission of the trigger.

3. The communication apparatus according to claim 1, wherein the negotiation information includes information that indicates a time interval between completion of transmission of the trigger and completion of transmission of a next trigger.

4. The communication apparatus according to claim 1, wherein the negotiation information includes information that indicates a timing of transmission of the data.

5. The communication apparatus according to claim 1, wherein the negotiation information includes information that indicates a length of the data.

6. The communication apparatus according to claim 4, wherein, in a case where the vehicle includes the two or more slave apparatuses, the timing of transmission of the data is different in the negotiation information that is transmitted from the master apparatus to each of the two or more slave apparatuses.

7. The communication apparatus according to claim 1, wherein, in a case where the vehicle includes the two or more slave apparatuses, the master apparatus and the two or more slave apparatuses are connected by daisy chain connection or bus connection.

8. The communication apparatus according to claim 1, wherein
the first communication method is Command and Response Mode (CRM) communication,
the second communication method is Periodic Data Collection Mode (PDCM) communication, and
the trigger is a Broadcast Read Command (BRC) trigger.

9. The communication apparatus according to claim 8, wherein the CRM communication, the PDCM communication, and the BRC trigger are defined by Distributed System Interface (DSI) 3 protocol.

10. The communication apparatus according to claim 1, wherein the one or more slave apparatuses is an ultrasonic sonar sensor.

11. A communication apparatus installed on a vehicle as one or more slave apparatuses for communicating with a master apparatus installed on the vehicle, by switching between a first communication method and a second communication method, the communication apparatus comprising:

a communicator that receives a command from the master apparatus in the first communication method, and that receives a trigger from the master apparatus and transmits data to the master apparatus in response to the trigger in the second communication method; and a controller that, during execution of the first communication method, causes negotiation information that indicates conditions for the second communication method to be stored in a memory, in a case where the negotiation information is received by the communicator, wherein upon completion of communication that satisfies the conditions after the first communication method is switched to the second communication method, the controller performs switching from the second communication method to the first communication method.

12. The communication apparatus according to claim 11, wherein the negotiation information includes information that indicates the number of times of transmission of the trigger.

13. The communication apparatus according to claim 11, wherein the negotiation information includes information that indicates a time interval between completion of transmission of the trigger and completion of transmission of a next trigger.

14. The communication apparatus according to claim 11, wherein the negotiation information includes information that indicates a timing of transmission of the data.

15. The communication apparatus according to claim 11, wherein the negotiation information includes information that indicates a length of the data.

16. The communication apparatus according to claim 14, wherein, in a case where the vehicle includes the two or more slave apparatuses, the timing of transmission of the data is different in the negotiation information that is transmitted from the master apparatus to each of the two or more slave apparatuses.

17. The communication apparatus according to claim 11, wherein, in a case where the vehicle includes the two or more slave apparatuses, the master apparatus and the two or more slave apparatuses are connected by daisy chain connection or bus connection.

18. The communication apparatus according to claim 11, wherein
the first communication method is Command and Response Mode (CRM) communication,
the second communication method is Periodic Data Collection Mode (PDCM) communication, and
the trigger is a Broadcast Read Command (BRC) trigger.

19. The communication apparatus according to claim 18, wherein the CRM communication, the PDCM communication, and the BRC trigger are defined by Distributed System Interface (DSI) 3 protocol.

20. A communication system comprising:
the communication apparatus that is used as the master apparatus according to claim 1; and
a second communication apparatus installed on the vehicle as one or more slave apparatuses for communicating with the master apparatus installed on the vehicle, by switching between the first communication method and the second communication method, the second communication apparatus comprising:

a second communicator that receives the command from the master apparatus in the first communication method, and that receives a trigger from the master apparatus and transmits data to the master apparatus in response to the trigger in the second communication method; and a second controller that, during execution of the first communication method, causes negotiation information that indicates conditions for the second communication method to be stored in the memory, in a case where the negotiation information is received by the second communicator, wherein upon completion of communication that satisfies the conditions after the first communication method is switched to the second communication method, the second controller performs switching from the second communication method to the first communication method.

* * * * *